United States Patent
Alexandrov

(10) Patent No.: US 6,809,483 B2
(45) Date of Patent: Oct. 26, 2004

(54) METHOD AND APPARATUS FOR ARC DETECTION AND PROTECTION FOR ELECTRONIC BALLASTS

(75) Inventor: Felix I. Alexandrov, Burlington, MA (US)

(73) Assignee: Osram Sylvania Inc., Danvers, MA (US)

(*) Notice: Subject to any disclaimer, the term of this patent is extended or adjusted under 35 U.S.C. 154(b) by 48 days.

(21) Appl. No.: 10/333,413
(22) PCT Filed: Jul. 23, 2001
(86) PCT No.: PCT/US01/23133
§ 371 (c)(1), (2), (4) Date: Jan. 21, 2003
(87) PCT Pub. No.: WO02/09479
PCT Pub. Date: Jan. 31, 2002

(65) Prior Publication Data
US 2004/0124785 A1 Jul. 1, 2004

Related U.S. Application Data
(60) Provisional application No. 60/220,044, filed on Jul. 21, 2000.

(51) Int. Cl.⁷ .............................................. H05B 37/02
(52) U.S. Cl. ........................ 315/224; 315/247; 315/291
(58) Field of Search ........................ 315/200 R, 209 R, 315/224, 225, 226, 246, 247, 276, 283, 289, 291, 307

(56) References Cited

U.S. PATENT DOCUMENTS

| | | | |
|---|---|---|---|
| 4,109,307 A | 8/1978 | Knoll | 363/101 |
| 5,208,542 A | 5/1993 | Tennies et al. | 324/544 |
| 5,308,952 A | 5/1994 | Bunker et al. | 219/130.4 |
| 5,491,386 A * | 2/1996 | Eriguchi et al. | 315/209 R |
| 5,519,289 A | 5/1996 | Katyl et al. | 315/224 |
| 5,569,984 A | 10/1996 | Holtslag | 315/307 |
| 5,574,336 A | 11/1996 | Konopka et al. | 315/225 |
| 5,619,105 A | 4/1997 | Holmquest | 315/225 |
| 5,623,187 A * | 4/1997 | Caldeira et al. | 315/307 |
| 5,751,115 A | 5/1998 | Jayaraman et al. | 315/225 |
| 5,834,905 A | 11/1998 | Godyak et al. | 315/225 |
| 5,859,505 A * | 1/1999 | Bergman et al. | 315/307 |
| 5,883,473 A | 3/1999 | Li et al. | 315/225 |
| 5,952,794 A * | 9/1999 | Bergman et al. | 315/307 |
| 6,181,076 B1 * | 1/2001 | Trestman et al. | 315/224 |

FOREIGN PATENT DOCUMENTS

DE    198 05 314    8/1999

* cited by examiner

Primary Examiner—Thuy Vinh Tran
(74) Attorney, Agent, or Firm—Carlo S. Bessone

(57) ABSTRACT

An electric arc detection apparatus and method is based on AC current rectification phenomena in air plasma that causes low frequency amplitude modulation of high frequency currents and voltages in the ballast when disconnecting the lamp (Lamp) from the electronic ballast with power applied. A protection circuit shuts off the inverter of the ballast so the duration of the arc is diminished so that the arc becomes almost non-visible. The protection circuit senses the input of the ballast inverter resonant tank, which is free of transients caused by resonance, detecting arc rectification frequency which is about 25–30 times less than the inverter carrier frequency, and turns on a switching device for stopping oscillations in the inverter. When the lamp (Lamp) is reconnected to the ballast, it resets the protection circuit and the ballast inverter restarts automatically.

38 Claims, 4 Drawing Sheets

METHOD AND APPARATUS FOR ARC DETECTION AND PROTECTION FOR ELECTRONIC BALLASTS

BACKGROUND OF THE INVENTION

1. Field of the Invention

This invention relates to electronic ballasts for powering a high frequency electrodeless fluorescent lamp. An electric arc appears in the lamp connector when disconnecting the lamp under power. It is destructive to the ballast and dangerous to the personnel replacing lamps. Also, arcing may be caused by poor connections in the fluorescent lamp wiring or disconnecting of crimped wire from the connector and may create a fire hazard.

2. Description of the Related Art

Since the fluorescent lamp is powered from a current source with high operating frequency (250 kHz or more), such as a self oscillating DC to AC inverter, a stable arc path is established between connector pins or between the connector pin and a lamp wire, even if two separated portions are placed by a distance of up to 1–2 inches from each other. At high frequency, recombination time of particles (electrons and ions) in arc plasma becomes comparable with AC frequency. When crossing zero current, it is not enough time for particles to be recombined in gas molecules and to stop the current flow and cancel the arc. Therefore, it should be done artificially by stopping oscillation in the ballast inverter with a shut down circuit susceptible to the arc.

There are a few known drawbacks, however. When the arc appears in the connector, there is no actual change in ballast high frequency voltages and currents that could be used for arc detection, as the voltage drop across the arc is negligible in relation to lamp rated voltage. Additionally, there is a large increase in ballast voltages and currents during normal lamp starting and they are also effected by low frequency 100/120 Hz steady-state modulation caused by the AC line rectifier. To avoid false responses, the arc detection circuit should not be susceptible to all of these disturbances, which occur during normal lamp operation.

The prior art teaches arc cancellation in the lamp connector by mechanically interlocking the ballast inverter when unplugging the lamp. In some ICETRON/ENDURA electrodeless lamps, additional pins are used in the connector to disconnected some components of the ballast inverter without which oscillations in the inverter cannot exist. However, the required three-wire connector is thick, expensive, and not applicable for a lamp that is placed a distance from the ballast.

Other references disclose different sensing means for arc detection, but they are only associated with low frequency AC devices, like electrical welding equipment, and not applicable for an arc in high frequency ballasts. Furthermore, the purpose of such devices is arc stability. In contrast, the purpose of the present invention in a ballast is arc cancellation.

Therefore, a protection method and circuit with fast arc cancellation capability is still needed. Another feature of the protection circuit should be a reset capability for restarting a reconnected lamp. The protection circuit is also required in the event that the ballast is mistakenly turned on without a lamp.

DESCRIPTION OF THE PREFERRED EMBODIMENTS

Figure 1A:
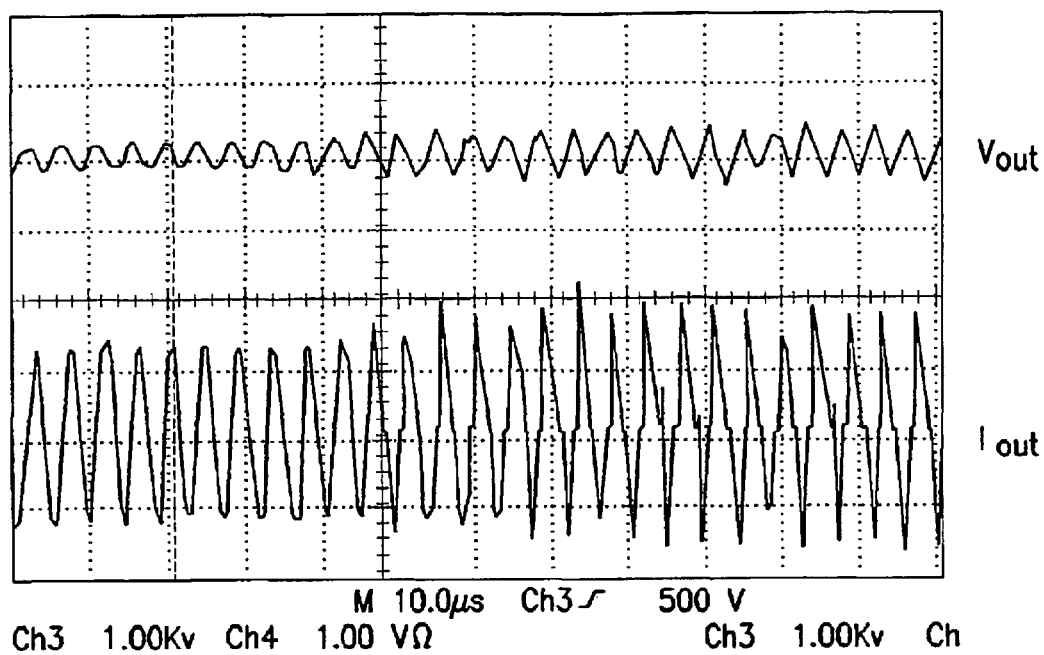
FIG. 1a illustrates arc current and ballast output voltage plots in transition from regular operation to arc condition caused by unplugging an electrodeless lamp.
Figure 1B:
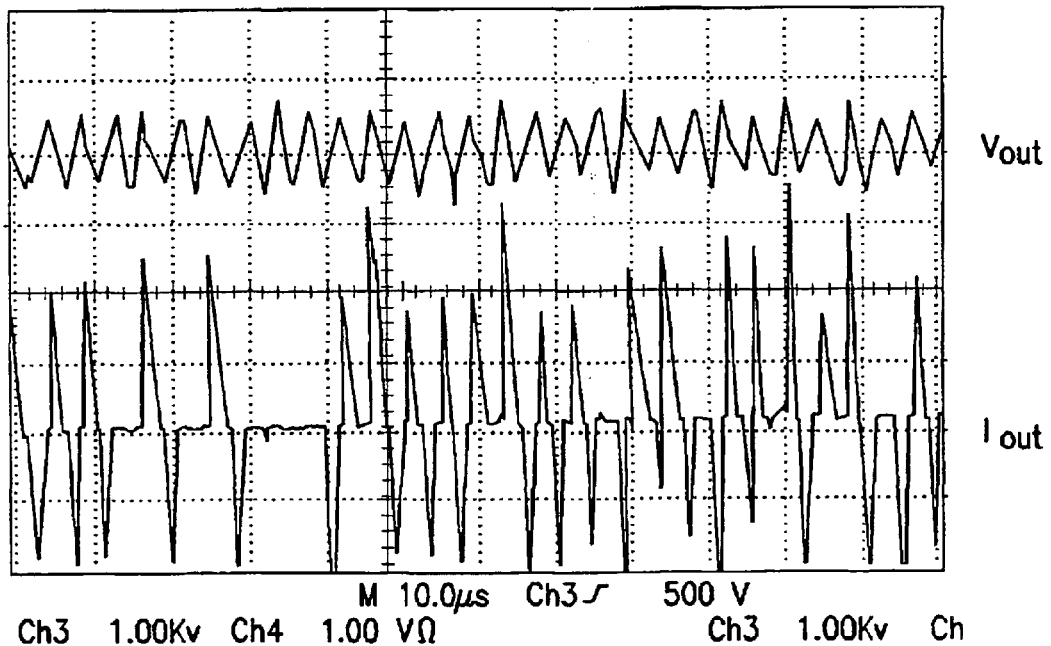
FIG. 1b illustrates the same parameters as those in FIG. 1a at a point when current rectification in the arc is starting.

In FIG. 1a, the upper plot is ballast output voltage $V_{out}$ and the bottom plot is ballast output current $I_{out}$ powering a lamp via a connector when the ballast is not provided with arc protection. The left side of the plots represents normal ballast operation with a lamp plugged in to the connector, just starting its movement away from the connector. It is at the very beginning of arcing, when the gap between connector pins is very small, that low voltage can break the gap. As the elements between which the arc has formed move further, the current waveform changes. Small steps are evident in arc AC current $I_{out}$ at zero crossings. This represents a beginning of the recombination process in plasma. But plasma in the gap still continues breaking in both directions by AC output voltage.

As the gap further increases, the recombination process advances, so air-plasma mixture in the gap stops breaking in one direction. This is shown by intervals in which high frequency current pulses follow randomly in one direction only. Depending on the concentration of particles in different spots of plasma, it call be broken in one direction and unbroken in the opposite direction. This means that a connector pin may operate as a cathode and the opposite pin as an anode, or vise versa. Accordingly, when the arc conducts, the ballast resonant capacitor provides extra current to the lamp in one direction and when it does not conduct, the capacitor absorbs extra current in the opposite direction. Therefore, a low frequency component appears in the output ballast voltage $V_{out}$.

Figure 5:
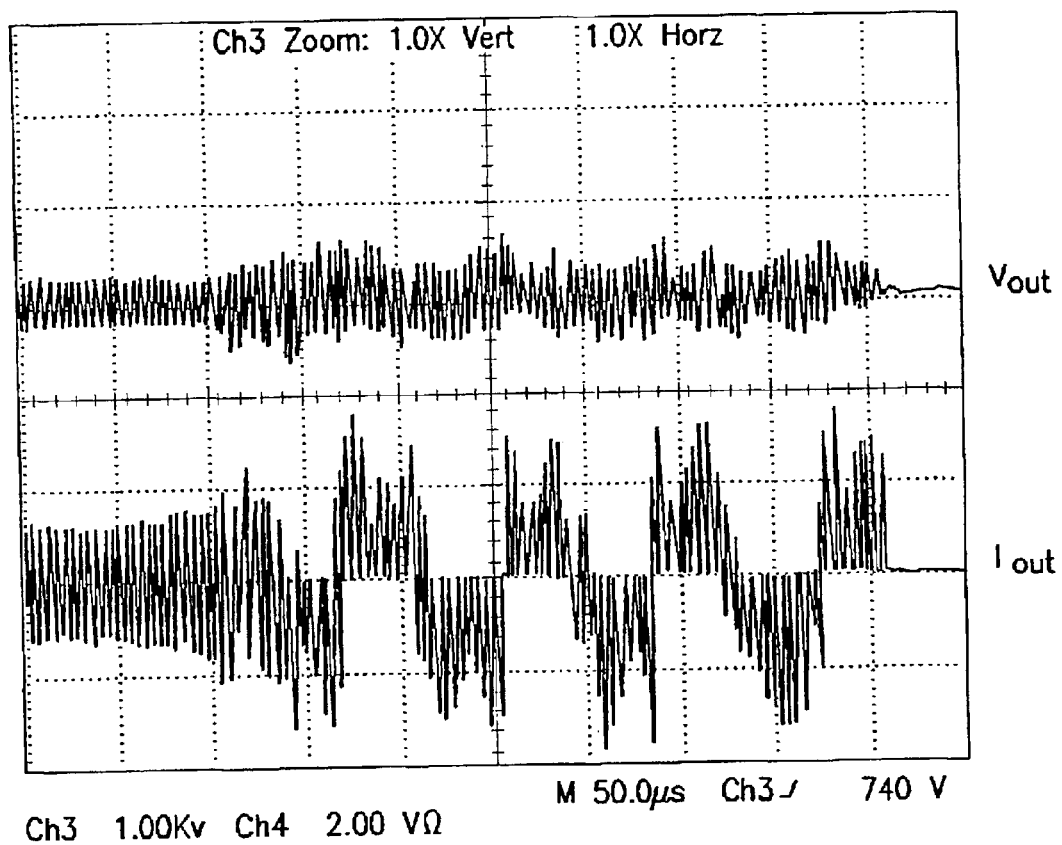
FIG. 5 illustrates arc current and output voltage plots of the ballast with arc cancellation, taken when unplugging an electrodeless lamp.

Further, low frequency oscillations create a situation in which higher absolute peak voltages are being applied in one direction and lower absolute peak voltages are being applied in the opposite direction. Therefore, the air/plasma mixture has a tendency of breaking in one direction (rectification effect). The low frequency oscillations become relatively stable, as illustrated in FIG. 5. This system can be classified as an oscillator with negative impedance wherein the air/plasma mixture represents this negative impedance.

Figure 2:
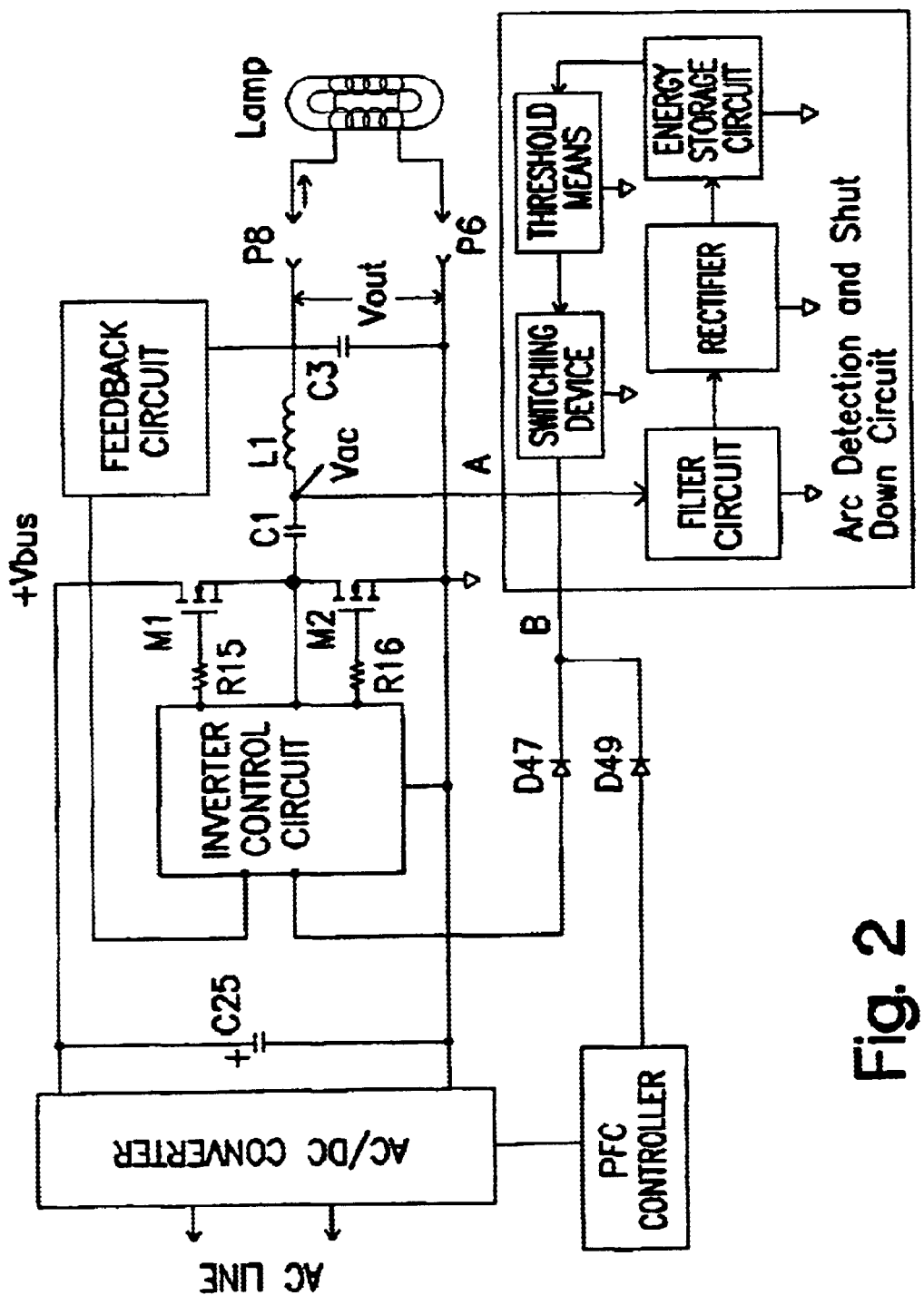
FIG. 2 shows a ballast circuit diagram with a block diagram of an arc detection and cancellation circuit of the present invention.

In the inverter of FIG. 2, low frequency amplitude modulation caused by arc rectification affects almost all voltages and currents in the ballast. However, these voltages and currents are inconvenient for arc detection since they are also affected by resonance during normal lamp starting. According to the invention, inverter resonance tank input voltage $V_{ac}$ (see FIG. 2) is utilized for detecting the arc in the connector, since this voltage is directly affected by arc rectification and is not affected by resonance.

The arc detection method is based on detection of the AC rectification phenomena that characterizes an electrical arc in air-plasma when it is powered from an AC current source. The above method comprises steps of generating an arc through an air gap as a result of disconnecting the lamp from an operating ballast, alternatively rectifying positive and negative ballast voltage pulses by the arc, generating low frequency amplitude modulation of the ballast output voltage, sensing input voltage of ballast inverter resonant tank, determining a low frequency signal of the voltage corresponding to the rectification frequency, filtering out such signal from all other signals applied to the resonant tank, rectifying the signal, and holding energy of the rectified signal for a few of its periods. This resulting signal is utilized to shut down the ballast inverter and cancel the arc.

The circuit illustrated in FIG. 2 includes elements of a known ballast circuit including a DC/AC inverter connected between a DC power source and a lamp connector. The DC power source may be a rectified AC source, a battery, or any other source of DC power.

The DC/AC inverter includes a capacitor C25 connected between common and DC voltage +Vbus. Also connected between +Vbus and common are switching transistors M1 and M2. The gates of M1 and M2 are separately connected through resistors R16 and R15, respectively, to outputs of an inverter control circuit. The point between M1 and M2 is connected to a first terminal of DC capacitor C1. A series resonant tank circuit is connected between a second terminal of C1 and common.

The series resonant tank circuit includes inductor L1 and capacitor C3. Lamp connector pins P6 and P8 are connected to respective terminals of the series resonant tank capacitor C3. A feedback circuit is connected between a point between L1 and C3 in the resonant tank circuit and an input of the inverter control circuit.

These features of a DC/AC inverter are known in the art.

The arc detection and cancellation circuit of the present invention (as illustrated in FIG. 2) includes a low pass signal filter circuit sensing the voltage $V_{ac}$ at the input of the inverter resonant tank designed to select low frequency voltage signal components that corresponds to arc rectification frequency, a rectifier connected to the output of the filter circuit for rectifying this voltage signal, an energy storage circuit for holding energy of these signals, a threshold device for noise immunity, and a latching switching device for shut down of the inverter and PFC through a disable terminal via diodes D47 and D49.

Figures 3, 4:
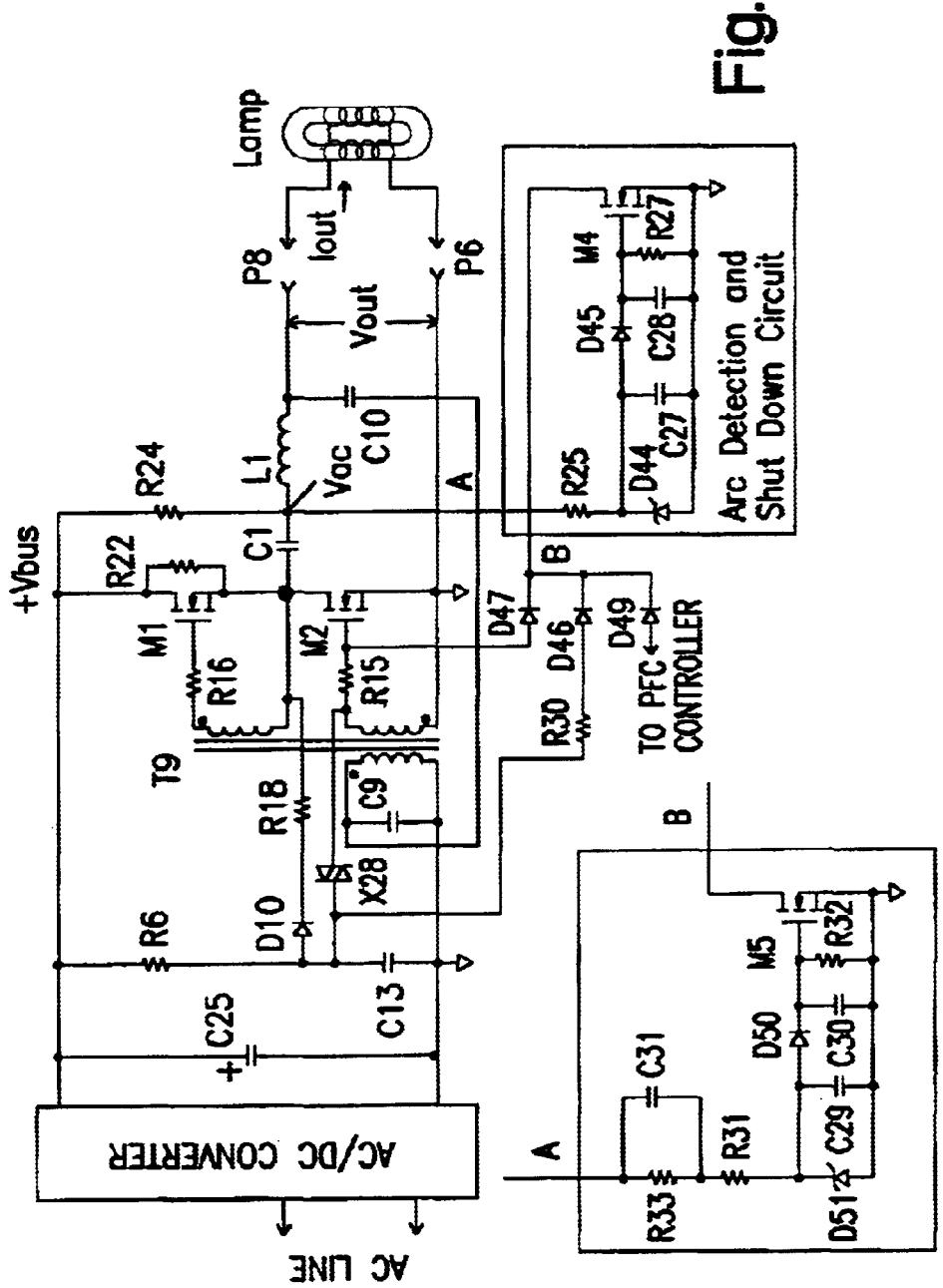
FIG. 3 shows a circuit diagram of ballast with a self oscillating inverter and an arc cancellation circuit.
FIG. 4 shows an arc detection and cancellation circuit with a notch filter.

In the embodiment illustrated in FIG. 3, a self oscillating inverter is formed by switching transistors M1 and M2 driven by a feedback transformer T9, DC capacitor C1, and the series resonant tank with inductor L1 and capacitor C3. An electrodeless lamp is connected in parallel to the resonant capacitor C3 through connector pins P6 and P8. The inverter start circuit comprises a discharge capacitor C13, a diac X28 and a resistor R6 connected to positive bus rail +Vbus. DC bus voltage is formed by a boost type AC/DC converter. It can be a power factor corrector (PFC), driven by a PFC controller (not shown in FIG. 3). An arc detection and shut down circuit comprises a low pass signal filter (R25, C27), a rectifier of the low frequency signal caused by the rectification process in the arc (diodes D44, D45), a storage capacitor C28, a discharge resistor R27 and, a switching transistor M4.

An advanced arc detection and shut down circuit illustrated in FIG. 4 comprises a low pass notch filter that is formed as a series combination of a RC low pass signal filter (R31, C29) and a low frequency block signal filter (R33, C31). This circuit has an input terminal A and an output disable terminal B corresponding to the terminals with the same designations of FIG. 3. The notch filter is tuned up to pass the low frequency signal generated by the electrical arc.

During normal operation of the ballast in FIG. 3, high carrier frequency rectangular voltage $V_{ac}$ is applied to input A of the arc detection circuit. This voltage is filtered out by low pass filter R25/C27. As a result, voltage across capacitor C27 is well below a diode drop voltage and has no effect on the input of the transistor M4. When arcing occurs and a low frequency rectification begins in the arc, a low frequency amplitude modulation is superposed on the high frequency voltage $V_{ac}$. RC filter R25/C27 has a low loss regarding a modulation frequency that is, at least, an order less than that of the carrier frequency, so that frequencies associated with normal lamp operation are filtered out. As an example, in the case of an ICETRON/ENDURA electrodeless lamp having carrier frequency of about 250 kHz, modulation frequency in the arcing connector is in the range of about 8–10 kHz. It creates a low frequency signal at the "A" input having a peak to peak voltage of a few tens of volts that is attenuated by the filter.

At least a few volts of the low frequency signal is applied across the diode D44. In the circuit of FIG. 3, for reasons of simplicity only a positive wave of the signal charges the capacitor C28 via the diode D44. The negative wave is shorted by the diode D44. When voltage across the gate of the transistor M4 reaches the turn-on threshold of the transistor, the transistor M4 starts being turned "on" with low frequency. It creates more disturbances at the input "A" of the arc detection circuit as well as higher voltage across the capacitor C28, and ultimately stops switching of the transistors M1 and M2. The capacitor C28 stores voltage that keeps the transistor M4 in the "on" condition during the recombination process of electrical particles in plasma. When impedance in the air gap changes from low to high, a latching signal from DC bus via the resistor R24 applies to the input "A" of the arc detection circuit.

The diode D44 can be selected as Zener diode that protects the gate of the transistor M4 from over voltage. Since Zener diodes have high parasitic capacitance, the capacitor C29 can be omitted. The shutdown transistor M4 shorts out the capacitor C13 through the disable terminal B via a diode D46 and limiting resistor R30, preventing the ballast from restarting the inverter after the shutdown. It also shuts off the PFC controller (not shown in FIG. 3) via a diode D49 and provides a reset capability. When the lamp is reconnected, it couples input "A" of the arc detection circuit to the "common", the capacitor C28 discharges via the resistor R27, and the shut down transistor M4 turns off, releasing the PFC controller and the capacitor C13 that charges and turns on the diac X28.

The operation manner of the arc detection circuit of FIG. 4 is similar to that of FIG. 3. By comparison, the input filter in FIG. 4 provides more noise immunity against transients generated during the inverter start up and against 100/120 Hz ripple coming from the AC line. Beyond that, R31 and C29 correspond to the filter formed by R25 and C27; D51 and D50 correspond to rectifying diodes D44 and D45; C30 corresponds to storage capacitor C28; R32 corresponds to discharge resistor R27; and M5 corresponds to shutdown transistor M4.

The further useful feature of the arc detection and shut down circuit in FIG. 3 is its ability to interlock the ballast start circuit when the ballast is powered on without a lamp connected. This circuit shorts out starting capacitor C13 before it is charged to the threshold voltage of diac X28.

As an example of a low cost solution for an ICETRON/ENDURA arc detection and shut down circuit such as that illustrated in FIG. 3, the following components can be used:

R24-1 MΩ; R25 and R27-470 kΩ; C27-1 nF; C28-470 pF; D44-1N5248B; D45, D46, and D49-1N4148; D47-IN4005GP; M4-IRFD014. With the above components, it takes about 5 msec to cancel an arc caused by disconnecting the lamp from the ballast, as illustrated in FIG. 5. This makes the arc non-visible and not dangerous.

The embodiments described above are intended to be illustrative and not limiting. It is recognized that various equivalents, alternatives, and modifications are possible within the scope of the appended claims.

What is claimed is:

1. An electronic ballast circuit for a lamp with arc detection comprising:
   a DC/AC inverter;
   a ballast output lamp connector;
   a low pass signal filter having an input electrically connected to the DC/AC inverter;
   a rectifier electrically connected to the low pass signal filter;
   an energy storage element electrically connected to receive a rectified output of the low pass signal filter;
   a switching device electrically connected to the energy storage element and to a disable terminal of the electronic ballast circuit;
   wherein the electronic ballast circuit is configured so that during normal operation of the lamp, the energy storage element is charged to a voltage less than a voltage required to close the switching device, and wherein under a condition of electrical arcing from the lamp connector of the electronic ballast, the energy storage element is charged to a voltage at least as high as the voltage required to close the switching device and activate the disable terminal.

2. The electronic ballast circuit of claim 1, wherein the disable terminal is connected through a switching transistor disabling diode to a gate of at least one of switching transistors of the inverter.

3. The electronic ballast circuit of claim 1, wherein the DC/AC inverter comprises an inverter control circuit, and wherein the disable terminal is connected through an inverter control circuit disabling diode to the inverter control circuit.

4. The electronic ballast circuit of claim 1, wherein the electronic ballast circuit further comprises a power factor correction element, the disable terminal being connected through a PFC disabling diode to the power factor correction element.

5. The electronic ballast circuit of claim 1, wherein the low pass signal filter comprises a filtering resistor and a filtering capacitor.

6. The electronic ballast circuit of claim 1, wherein the rectifier comprises at least one diode.

7. The electronic ballast circuit of claim 6, wherein the rectifier comprises a first rectifying diode connected in parallel with the filtering capacitor.

8. The electronic ballast circuit of claim 7, wherein the rectifier comprises a second rectifying diode electrically connected to the energy storage element.

9. The electronic ballast circuit of claim 8, wherein the first rectifying diode is a Zener diode.

10. The electronic ballast circuit of claim 1, wherein the energy storage element comprises a storage capacitor.

11. The electronic ballast circuit of claim 1, wherein the switching device comprises a transistor connected between the output node and ground.

12. The electronic ballast circuit of claim 11, wherein the energy storage element is connected to a control terminal of the transistor.

13. The electronic ballast circuit of claim 12, wherein the switching device is a FET and the energy storage element is a capacitor connected to a gate of the FET.

14. The electronic ballast circuit of claim 1, wherein the low pass signal filter is a low pass notch signal filter comprising a low frequency block signal filter.

15. The electronic ballast circuit of claim 14, wherein the low frequency block signal filter comprises a low frequency block resistor and a low frequency block capacitor connected in parallel with one another.

16. An arc detection circuit for an electronic lamp ballast comprising:
    an input node;
    a low pass signal filter electrically connected to the input node;
    a rectifier electrically connected to the low pass signal filter;
    an energy storage element electrically connected to receive a rectified output of the low pass signal filter;
    a switching device electrically connected to the energy storage element and to an output node;
    wherein the arc detection circuit is configured so that when the input node is connected to an AC output voltage of the electronic lamp ballast during normal operation of the lamp, the energy storage element is charged to a voltage less than a voltage required to close the switching device, and wherein under a condition of electrical arcing from a lamp connector of the electronic ballast, the energy storage element is charged to a voltage at least as high as the voltage required to close the switching device.

17. The arc detection circuit of claim 16, wherein the low pass signal filter comprises a filtering resistor and a filtering capacitor connected in series with one another.

18. The arc detection circuit of claim 16, wherein the rectifier comprises at least one diode.

19. The arc detection circuit of claim 18, wherein the rectifier comprises a first rectifying diode connected in parallel with the filtering capacitor.

20. The arc detection circuit of claim 19, wherein the rectifier comprises a second rectifying diode arranged in series with the energy storage element, the second rectifying diode and the energy storage element together being connected in parallel with the filtering capacitor.

21. The arc detection circuit of claim 20, wherein the first rectifying diode is a Zener diode.

22. The arc detection circuit of claim 16, wherein the energy storage element comprises a storage capacitor.

23. The arc detection circuit of claim 16, wherein the switching device comprises a transistor connected between the output node and ground.

24. The arc detection circuit of claim 23, wherein the energy storage element is connected to a control terminal of the transistor.

25. The arc detection circuit of claim 24, wherein the switching device is a FET and the energy storage element is a capacitor connected to a gate of the FET.

26. The arc detection circuit of claim 16, wherein the low pass signal filter is a low pass notch signal filter comprising a low frequency block signal filter.

27. The arc detection circuit of claim 26, wherein the low frequency block signal filter comprises a low frequency block resistor and a low frequency block capacitor connected in parallel with one another.

28. A method of detecting and stopping an electrical arc from a ballast connector, wherein a lamp is energized via the ballast connector by a resonant inverter including an inverter control circuit controlling switching transistors to produce an AC voltage to a series resonant tank in the inverter, the method comprising the steps of:

filtering the AC voltage with a low pass filter to remove AC components at least as high as frequency components associated with normal operation of the inverter;

charging an energy storage element from an output of the low pass filter so that the energy storage element is charged to voltage higher than a threshold voltage when frequency components of the AC output voltage lower than the frequency components associated with normal operation of the inverter are present; and disabling the inverter when the energy storage element reaches the threshold voltage.

29. The method of claim 28, wherein the disabling step comprises disabling the inverter control circuit.

30. The method of claim 28, wherein the disabling step comprises disabling at least one of the switching transistors.

31. The method of claim 28, wherein the inverter is connected to a power factor correction unit, and wherein the disabling step comprises disabling the power factor correction unit.

32. The method of claim 28, wherein the AC input voltage to the low pass filter is taken from an electrical point of the inverter between the switching transistors and the series resonant tank circuit.

33. The method of claim 32, wherein the AC voltage is taken from an electrical point in the inverter between a DC capacitor electrically connected to the switching transistors and the series resonant tank circuit.

34. The method of claim 33, wherein the AC voltage is taken from an electrical point in the inverter connected to both the DC capacitor and an inductor in the series resonant tank circuit.

35. A method for detecting an arc from a ballast connector, wherein a lamp is energized via the ballast connector by a resonant inverter including an inverter control circuit controlling switching transistors to produce an AC voltage to a series resonant tank in the inverter, the method comprising the steps of:

sensing the AC voltage;

filtering out components of the sensed AC voltage other than low frequency components corresponding to a rectification frequency of the arc to produce a filtered signal;

rectifying said filtered signal;

storing energy of the rectified filtered signal over a plurality of periods; and generating an arc detection signal based on the stored energy.

36. The method of claim 35, wherein the AC voltage is taken from an electrical point in the inverter between the switching transistors and the series resonant tank circuit in the inverter.

37. The method of claim 36, wherein the AC voltage is taken from an electrical point in the inverter between a DC capacitor electrically connected to the switching transistors and the series resonant tank circuit.

38. The method of claim 37, wherein the AC voltage is taken from an electrical point in the inverter connected to both the DC capacitor and an inductor in the series resonant tank circuit.

* * * * *